US006990105B1

(12) United States Patent
Brueckheimer et al.

(10) Patent No.: US 6,990,105 B1
(45) Date of Patent: Jan. 24, 2006

(54) TRANSPORTING MULTIPROTOCOL DATAGRAMS

(75) Inventors: Simon Daniel Brueckheimer, London (GB); Leslie Derek Humphrey, Harlow (GB); David John Stacey, Stanstead Abbotts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/509,089

(22) PCT Filed: Sep. 21, 1998

(86) PCT No.: PCT/GB98/02807

§ 371 (c)(1), (2), (4) Date: Jun. 22, 2000

(87) PCT Pub. No.: WO99/16283

PCT Pub. Date: Apr. 1, 1999

(30) Foreign Application Priority Data

Sep. 22, 1997 (GB) .................................... 9720130

(51) Int. Cl.
*H04L 12/56* (2006.01)

(52) U.S. Cl. .................................................. 370/395.5

(58) Field of Classification Search .............................. 370/395.6–395.64, 395.5–395.54
See application file for complete search history.

(56) References Cited

U.S. PATENT DOCUMENTS

| | | | | | |
|---|---|---|---|---|---|
| 5,467,342 | A | * | 11/1995 | Logston et al. | 370/253 |
| 5,742,599 | A | * | 4/1998 | Lin et al. | 370/395.65 |
| 5,822,319 | A | * | 10/1998 | Nagami et al. | 370/392 |
| 5,870,474 | A | * | 2/1999 | Wasilewski et al. | 380/211 |
| 5,878,041 | A | * | 3/1999 | Yamanaka et al. | 370/395.65 |
| 5,936,965 | A | * | 8/1999 | Doshi et al. | 370/469 |
| 5,946,309 | A | * | 8/1999 | Westberg et al. | 370/395.3 |
| 6,041,054 | A | * | 3/2000 | Westberg | 370/389 |
| 6,075,788 | A | * | 6/2000 | Vogel | 370/395.51 |
| 6,075,798 | A | * | 6/2000 | Lyons et al. | 370/474 |

OTHER PUBLICATIONS

Bell Labs Technical Journal vol. 2 No. 2, Spring 1997, J H Baldwin et al, “AAL-2—A New ATM Adaption Layer for Small Packet Encapsulation and Multiplexing”.

* cited by examiner

*Primary Examiner*—Kwang Bin Yao
*Assistant Examiner*—Thai Hoang
(74) *Attorney, Agent, or Firm*—Barnes & Thornburg LLP

(57) ABSTRACT

Point to point protocol (PPP) traffic is transported over an asynchronous transport link by encapsulating the traffic in AAL2 minicells and transporting the minicells in a single virtual circuit. Minicells from a number of users can be multiplexed in the same virtual circuit.

84 Claims, 15 Drawing Sheets

| Protocol Identifier (8 or 16 bits) | Information | Optional Padding |
|---|---|---|

*Fig. 2* PPP Format

TRANSPORTING MULTIPROTOCOL DATAGRAMS

This invention relates to a system and method for the transport of multi-protocol datagrams over an ATM network. The invention further relates to an improved point to point protocol for the transport of datagrams.

BACKGROUND OF THE INVENTION

The current point to point protocol (PPP) provides a common standard for transporting multi-protocol datagrams over a point-to-point link. It provides the features of encapsulation, link configuration, maintenance, and authentication. PPP is used in many applications. In particular, the protocol has found significant usage for dial-up access to the Internet via the PSTN. The PPP protocol has been defined by the Internet Engineering Traffic Forum (IETF) and a general description of the protocol is given in 'The point to point protocol, editor W. Simpson, July 1994, IETF RFC 1661'. A number of different datagram protocols or formats are provided for and these are allocated corresponding identifier numbers in IETF document RFC 1700, editor J. Reynolds, October 1994.

It will be appreciated that the different services that are supported by the PPP protocol have different quality of service (QoS) criteria. In current systems, this necessitates a separate channel with appropriate band width for each quality of service. This is wasteful in terms of traffic handling capacity, particularly where a single user has set up a multi-protocol PPP session and will need to occupy a number of channels.

SUMMARY OF THE INVENTION

An object of the invention is to provide an improved system and method for the transport of PPP traffic over an ATM network.

According to one aspect of the invention there is provided a method of transporting point to point protocol (PPP) traffic over an asynchronous transport link, the method including encapsulating the traffic in minicells, and transporting said minicells in a single virtual circuit.

In a further aspect, the invention provides a method of trunking PPP sessions such that the multiple sessions are transported in a single virtual channel.

In another aspect, the invention provides a method and arrangement for trunking PPP media in a groomed manner in the same or alternate virtual channels together with non-PPP traffic without adverse effect on the QoS of these services.

ATM adaptation layer two (AAL2) is a newly emerging standard which is being developed by the ITU-T for the transport of variable length packets over ATM networks. In this standard, a single AAL2 virtual circuit (VC) contains a multiplex of up to 256 individual data channels (commonly referred to as minichannels). Unlike traditional ATM, the packet payload size is arbitrary. A single AAL2 packet may contain between 0 and 64 octets of payload. We have found that arbitrarily large datagram structures can be transported via a packet segmentation and re-assembly procedure that is also being defined as part of the standard. The AAL2 minichannel packets are multiplexed asynchronously into a single VC with a three byte packet header being used to identify the minichannel address and packet size.

We have found that AAL2 can be utilised to encapsulate PPP. Moreover, this encapsulation permits PPP to be used over any transport link supporting ATM. PPP operates over a dedicated circuit which could be either an ATM virtual circuit (VC) or an AAL2 minichannel. With our arrangement and method therefore, a single VC is always sufficient to fully encapsulate the PPP protocol. The distinct protocols that are encapsulated into a PPP session can be transported within individual AAL2 minichannels, or multiple PPP sessions may operate within the same VC or the same AAL2 minichannel. The use of AAL2 reduces the number of VCCs required, simplifies the encapsulation of PPP, and improves the efficiency of the encapsulation. Further the use of AAL2 enables the use of both SVC and PVC encapsulation and allows either dynamic or static configuration of the channel assignments. Additionally, AAL2 offers the benefit that the multiplexing of the distinct protocols encapsulated in a PPP session may be performed in the protocol, PPP and AAL layers thereby providing flexible arrangements of network architectures and allowing existing applications to operate as if using a native IP network.

BRIEF DESCRIPTION OF THE DRAWINGS

Embodiments of the invention will now be described with reference to the accompanying drawings in which:

FIG. 2 shows the format of a PPP frame;

DESCRIPTION OF PREFERRED EMBODIMENTS

Figure 1:
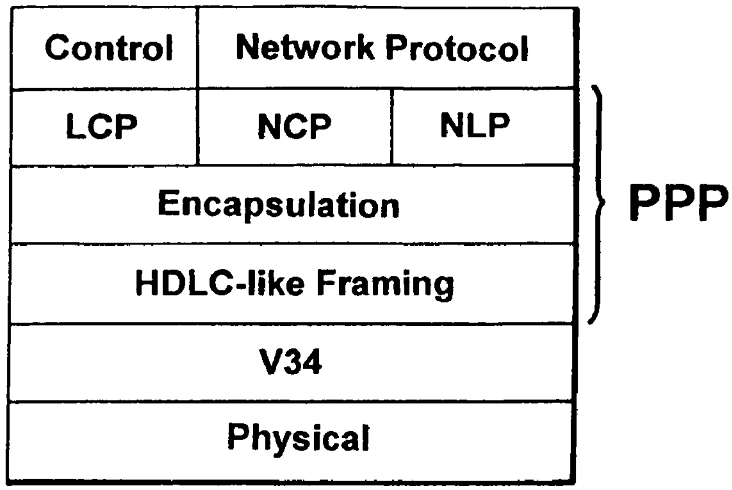
FIG. 1 is a schematic diagram illustrating a point to point (PPP) protocol stack.

Reference is first made to FIGS. 1 and 2 which are introduced for explanatory purpose as an aid to better understanding of the invention. FIG. 1 illustrates the use of PPP to encapsulate datagrams over a dial up link via the PSTN/ISDN. The point to point protocol (PPP) provides a common standard for transporting multi-protocol datagrams over point-to-point links and is comprised of 3 main components. These are; a method for encapsulating datagrams from multiple protocols; a link control protocol (LCP) for establishing, configuring (including authentication), and testing the data-link connection; and a family of network control protocols (NCPs) for establishing and configuring different network-layer protocols (NLPS). The NCPs and NLPs are allocated as pairs in PPP. Thus IP is one example of an NLP and its associated control channel, the NCP, is referred to as IPCP. FIG. 1 shows an example protocol stack where PPP is being used to encapsulate datagrams over a dial up link via the PSTN/ISDN.

In PPP, the protocol field is used to identify the datagram type. A number of protocol identifiers have been defined covering the variety of supported LCPs, NCPs and NLPs. The full list of currently defined protocol identifiers is found in the above referenced IETF RFC 1700 document. Typically, for commonly used protocols two identifiers are assigned, one for a control channel (the NCP) and one for the data (the NLP). There is a one-to-one relationship between assigned NCP/NLPs. For example IP data is assigned 0x0021 and the IP control channel (IPCP) of 0x8021. Although the protocol identifiers are two octets in length, their format has been defined such that high usage PPP datagrams (typically the NLPs) can be transmitted in an optional compressed one byte protocol field. To enable this, the assigned numbers are all defined such that the LSB of the most-significant octet is zero and the LSB of the least-significant octet is set to one. Thus it is always possible to distinguish between a full two-byte field and a compressed single byte field.

Figure 3:
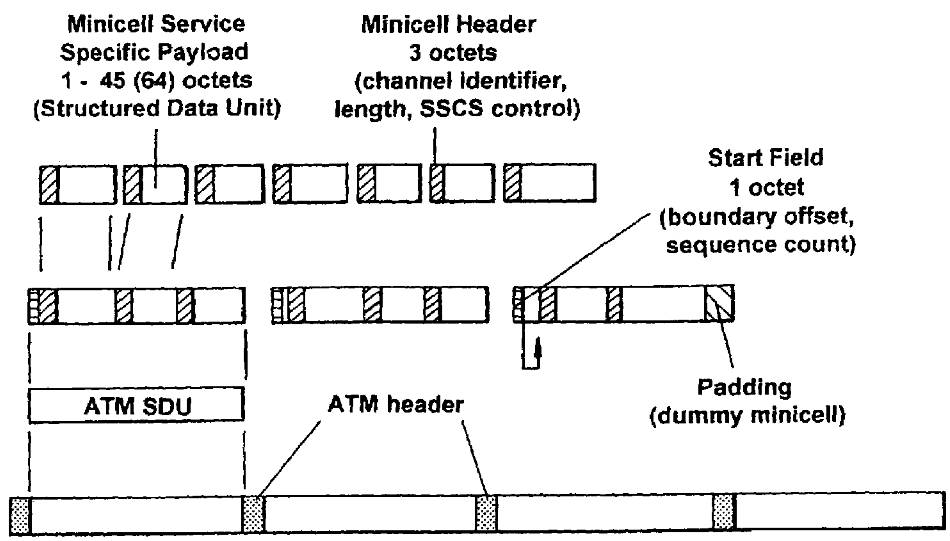
FIG. 3 illustrates the multiplexing of AAL2 minicells into ATM.

Referring now to FIG. 3, which is also included for explanatory purposes, this illustrates the multiplexing of AAL2 minicells. The AAL-2 adaptation layer was initially optimised to cope with the demands of low bit-rate communications, representing the increasing trend to greater voice compression. The adaptation layer is a multiplex of users in a single ATM connection, where each user's information is carried in a short packet, sometimes referred to as a minicell, with a header identifying the user channel together with ancillary control information.

By sharing the fixed length payload of the ATM cell between users, the compromise of trading cell assembly delay for bandwidth efficiency is overcome, this being a sacrifice which would otherwise be acute at low bit-rates and on expensive leased lines. The AAL-2 adaptation equipment performs a concentration function to ensure high utilisation, but can also limit the holdover delay of traffic when usage is low.

In FIG. 3, each minicell carries a service specific payload or a structured data unit. A three octet header incorporates a channel identifier (CID), a length indicator and SSCS control. The minicells are assembled into ATM cells, each set of minicells being provided with a start field pointing to the start of the first minicell to effect cell delineation. Where an ATM cell is not completely filled, padding in the form of a dummy minicell may be provided to complete the payload. A further feature of minicells is that they may be of variable size, from 1 to 64 octets, to accommodate a wide variety of applications with minimal overhead. Additionally, a common methodology to segment and reassemble arbitrarily long datagram structures into the packet format is being standardised. We have found that AAL2 is suited to the encapsulation of any datagram structure regardless of length and that the adaptation and packetisation can be tailored to the requirements of the service being supported and not fixed to the underlying transport layer.

The mapping to ATM cells is fully asynchronous and in fact quite independent of the length of an ATM cell. The boundary of minicells in the ATM cell payload is signified in every cell by a start field (STF), which specifies the offset, and the minicells form a self-delineating flow. The AAL-2 protocol format can thus be employed to carry minicells transparently over access systems which have fixed frame formats other than ATM cells, such as MPEG-2 transport stream. In fact minicells do not require an ATM cell or other frame structure at all, as it is possible to map the start field octet once every 48 octets (or other regular interval) with minicells in the intervening octet positions directly onto any physical bearer. The bearer identity can be used to regenerate the implicit ATM cell headers where the VCC needs to be transported over conventional ATM transmission.

The minicell is structured so that services of different types can be supported as service specific convergence sublayers (SSCS), all carried over the minicell common part sublayer (CPS) identically. The minicell header includes channel identity, length and user-to-user information (UUI), the latter allowing the functions of an SSCS to be specialised according to purpose. Examples of SSCS formats currently being defined are one to support voice and one to support data, including the functionality of segmentation and re-assembly (SAR) defined in the I.366.1 Standard. Preferred embodiments of the invention will now be described below with reference to FIGS. 4 to 13 of the accompanying drawings.

Figure 4:
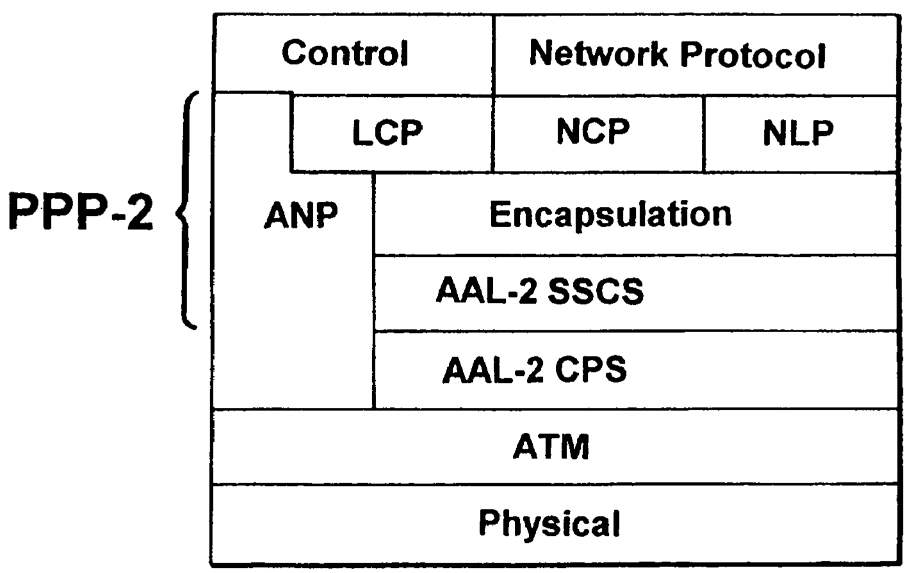
FIG. 4 shows an improved PPP stack according to a first embodiment of the invention.

In a first exemplary embodiment of the invention illustrated in FIG. 4, there is a one to one static reference provided between the protocol identifier and the minichannel address. The 8 bit AAL2 address space provided within the CID (channel identifier) field of the packet header can be increased, on an as-needed basis, by using the first octet of the packet payload. The extension of the address space in this way is possible since in this instance the PPP is designed to operate over a point-to-point link and thus there is no switching at the AAL2 layer, only in the ATM layer. The PPP overhead is minimised by only sending the additional octet when needed (i.e. for the infrequently used protocol identifiers in the range 0x0200 to 0xffff). Thus in this embodiment, we adopt a similar paradigm to the compressed address option available within PPP. To achieve this the least-significant octet of the protocol identifier is transmitted in the CID field of the packet header, and when necessary the most-significant octet is transported in the first octet of the packet payload. The LSB of the least-significant octet is used to indicate the presence or absence of the most-significant octet. A zero indicates no following most-significant octet; a one indicates a following most-significant octet. Thus for IP the user datagram (IP NLP=0x0021) would be indicated via the CID value of 0x20, whilst its control channel (ILCP NCP=0x8021) would be indicated via a CID field of 0x21 followed by a first octet packet payload of 0x80, and the Link Control Protocol (LCP=0xc021) would be indicated via a CID field of 0x21 followed by a first octet packet payload of 0xc0. There is no loss in generality in this approach of using the LSB of the CID field to indicate a further octet of addressing information since the PPP specification states that all protocol identifiers must be odd (to enable the optional compression to one byte)—thus this bit is not used as part of the PPP protocol address.

The LSB of the most-significant-octet (when used) provides a 1 bit parity check for error detection. Note that the LSB has no significance for the protocol identification. Further robustness against errors in this field is provided by the segmentation and re-assembly SSCS error detection capabilities which would operate over the complete set of payloads constituting a data frame.

The PPP information field is encapsulated into the AAL2 packet payload. A standardised SSCS segmentation and re-assembly (SAR) function enables arbitrary length information datagrams to be transported. Further since AAL2 supports variable length packets there is never a requirement to transport the optional padding field of PPP. This improves efficiency by avoiding the need to transmit what are effectively empty packets.

An advantage of this method of PPP encapsulation is that it is possible (via the CID) to provide differing levels of QoS to the different protocols encapsulated into the session.

In a second embodiment of the invention, which exploits the limited number of protocol identifiers that are currently allocated, only seventy identifier numbers are currently assigned. Thus the 16 bits assigned to the protocol identifier field is significantly larger than needed. The 8-bit CID field of the AAL2 packet header is therefore completely sufficient to identify the current number of assigned identifiers, with significant further capability for future expansion. In this second aspect of the invention therefore, we provide a pre-configured table of CID values. Each CID value is assigned one of the PPP assigned numbers. The assignment of CID values to PPP identifiers may be predetermined by a recognised standards procedure or could be set-up on a link-by-link basis via a management function or meta-signalling.

In a further embodiment of the invention, use is made of the AAL2 negotiation procedures (ANP ITU Q.2630.1) to establish and manage PPP sessions. In this embodiment, an AAL2 VC is set-up in the normal manner via management or signalling. On initialisation, the VC will contain a single minichannel as normal—the ANP channel. To establish a PPP session the requesting entity initiates ANP to establish an LCP channel. The ANP negotiates the establishment of a minichannel in the normal manner. The LCP channel can then establish and configure the PPP session in the normal manner. Once established, the individual NLP/NCP channels are established in a similar manner to the second embodiment described above with the exception that the ANP is used to set-up and tear down the individual minichannels. The NCP can use ANP when for example establishing cut-through sessions.

An advantage of this embodiment is that a single VC may be used to establish multiple PPP sessions. A standard AAL2 relay function can be used to route the PPP sessions to different points within the network. Thus for example a home user might have two simultaneous PPP sessions established, one to a corporate Intranet and one to a commercial ISP. Over the access network these two sessions are encapsulated into a single VC. At the interface to the core ATM network a relay function can be used to relay all PPP sessions to a particular route (say the ISP) in a single VC. Thus at all points in the network, the number of VCs used is minimised so as to reduce the associated signalling overhead.

A further advantage of this embodiment is that it has the ability to transport both PPP sessions and non-PPP session in the same VC. For example, a voice call can be sent in the same channel as a PPP encapsulate Internet session thus ensuring VC signalling and establishment is minimised and optimising the utilisation of bandwidth within a VC.

Figure 5:
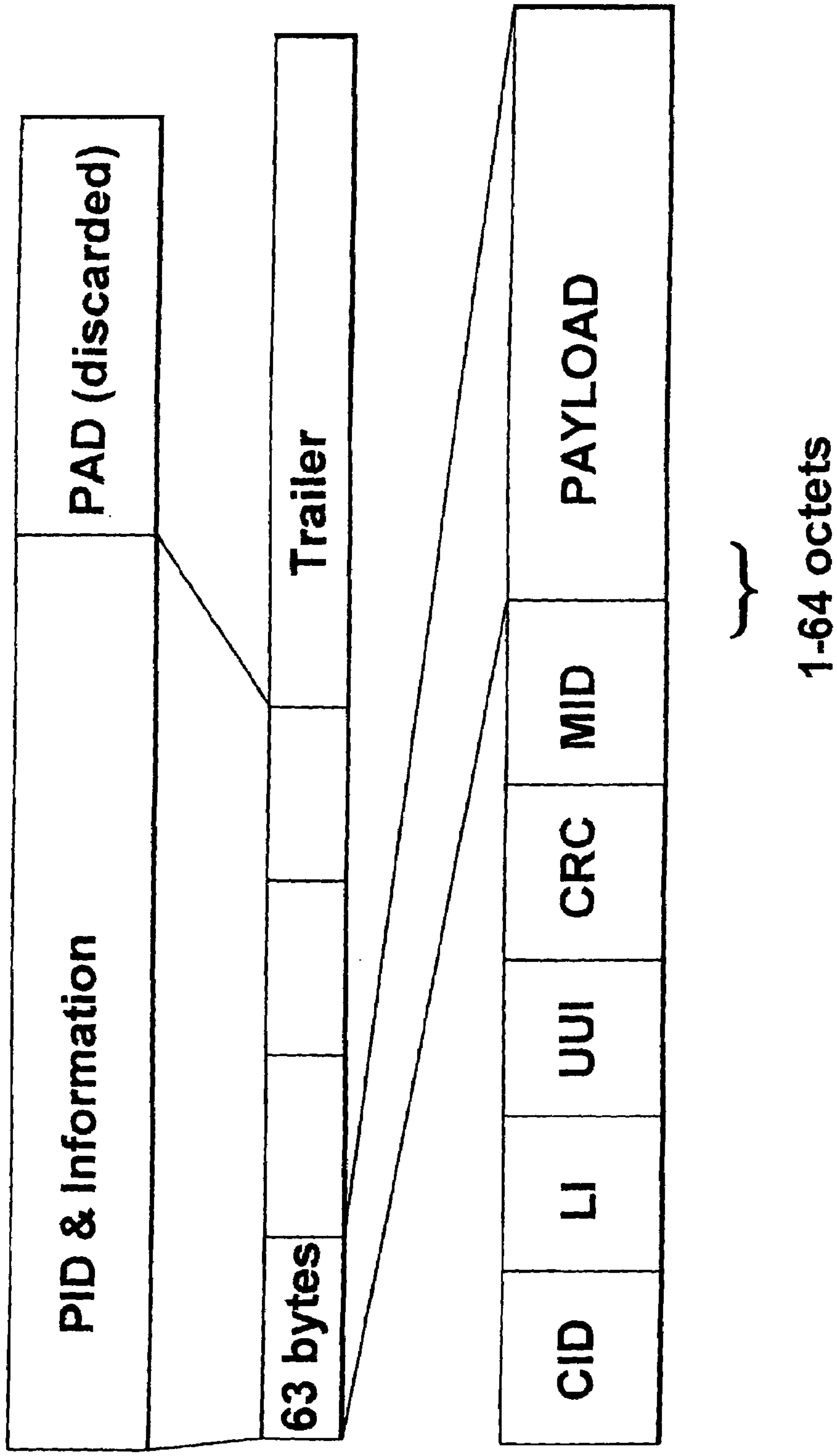
FIG. 5 illustrates the segmentation of a datagram over a number of minicells.
Figure 6:
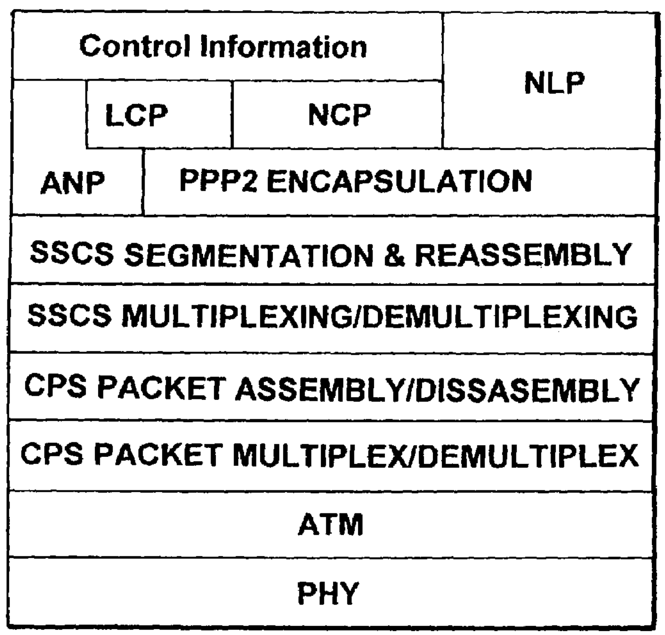
FIG. 6 shows an improved PPP stack according to a second embodiment of the invention.
Figure 7:
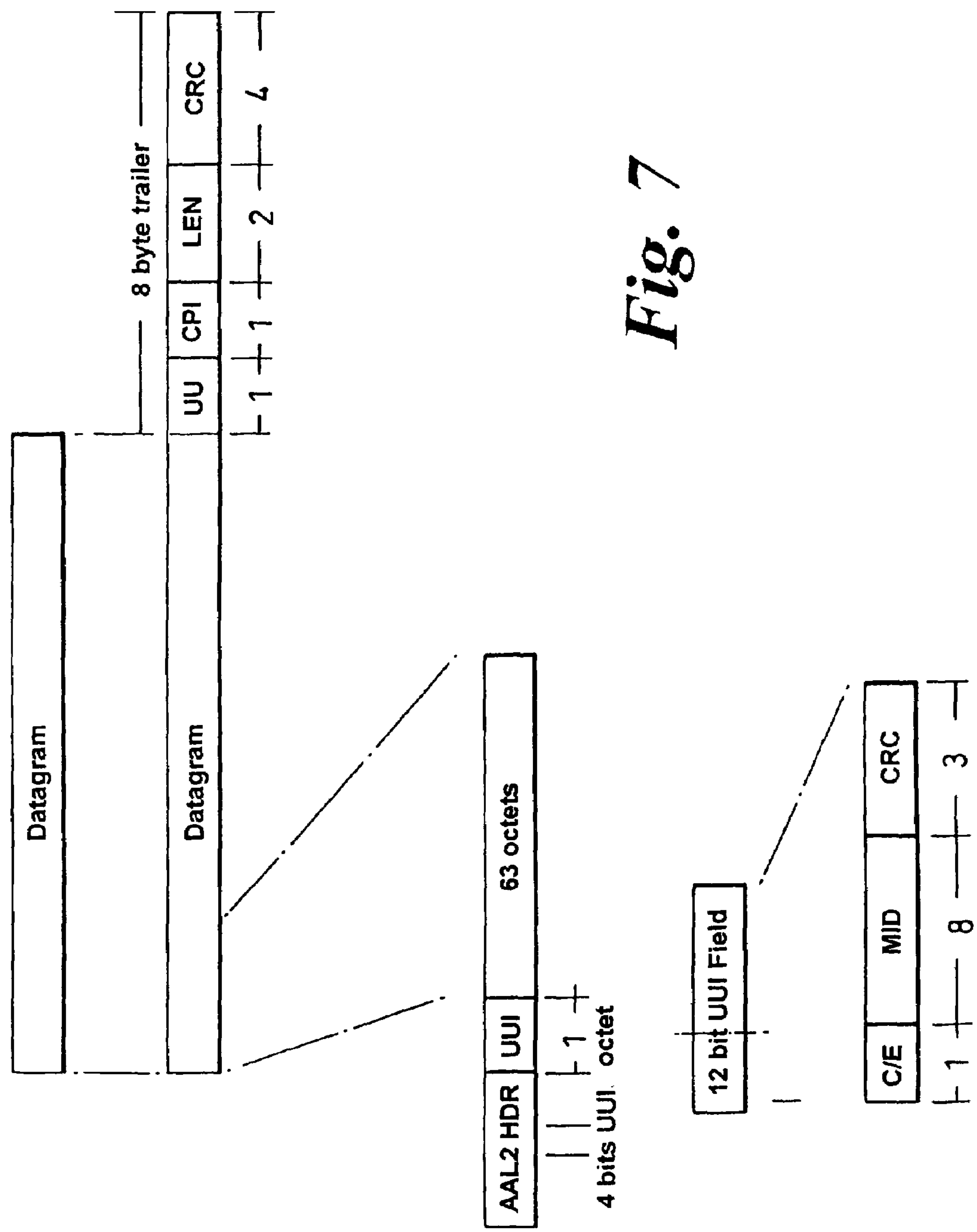
FIG. 7 shows an arrangement for routing encapsulated PPP traffic.

FIG. 5 illustrates the segmentation of long datagrams over a number of minicells. The PPP information together with the protocol identifier is mapped into the payload of a datagram which is provided with a trailer comprising UUI, CPI, LI and CRC fields or as specified by the AAL5 and/or the I.366.1 standards. The datagram payload is then segmented into 64 (or optionally 63) byte portions which are mapped into the minicell payload, this being provided with a header comprising CID, LI, UUI, CRC (and optional multiplex MID) fields. The LSB of the UUI field provides an indicator of the continuation/end of a segmented datagram.

A further extension to this embodiment can be achieved by extending the SSCS function that performs the SAR to include the ability to multiplex at the SSCS layer. In this way, multiple sources can be multiplexed into a single AAL2 minichannel. This enables a choice to be made as to how the individual PPP channels are encapsulated into AAL2 (via multiplexing at the SSCS or CPS layer). Thus a full PPP session could be encapsulated into a single AAL2 minichannel enabling the number of simultaneous PPP sessions within a single VC to be maximised, or a separate minichannel could be used to encapsulate a single protocol of the PPP session only. Typically one might wish to allocate an AAL2 channel to each level of priority within the PPP session. Thus all delay sensitive channels might be encapsulated into a single CID and all delay insensitive channels into a further CID. The ability of AAL2 to prioritise minichannels can then be used to ensure the delay sensitive services are subjected to minimum delay. The extended PPP stack for these embodiments is shown schematically in FIG. 6.

As discussed above, the AAL2 minichannels form an asynchronous self-delineating stream that is carried within ATM payloads. Thus the ATM cells essentially perform a transport function only. Therefore AAL2 minichannels can be carried directly over any regular transport structure (for example MPEG-2 TS frames or TDMA time slots) without the need to carry ATM. Thus, by using our arrangement, the use of PPP can be extended to cover any regular transport structure used in the access network. A relay point at the interface to the ATM core network can be used to readapt the minichannels into and out of ATM cells.

The flexibility of the AAL2 encapsulation of PPP sessions can be further extended by enhancement of the AAL2 SAR function to include the ability to multiplex messages within the SSCS layer in a manner analogous to the AAL3/4 protocols. The format of the SSCS SAR is shown schematically in FIG. 7. Referring to this figure, the format is compatible with current ITU-T proposals (e.g. I.366.1 AAL2 SAR) and includes an optional eight byte trailer that is added to the datagram to be segmented. The segmented datagram forms the payload of an appropriate number of AAL2 packets each incorporating a header and a UUI (user to user information) field. A single flag is coded into the UUI bits to indicate whether the particular datagram with its optional trailer extends into a following AAL2 packet or whether the current packet is in fact the last packet of the sequence.

In particular, a multiplex identifier (MID) field is added to the SSCS to enable multiple messages to be interleaved in parallel within one minichannel. To provide the MID field in a preferred embodiment, a single octet at the beginning of each AAL2 packet payload may be used. The MID field can, in a further embodiment, be longer than a single octet and can be used in conjunction with four bits of the UUI field to form an extended UUI field. This extended field can be formatted into a continuation/end (CE) flag (one bit), an eight bit MID field and a three bit CRC field providing error detection over the extended UUI field. Thus, with the extended SAR function, it is possible to concentrate multiple PPP sessions, the protocols thereof and/or multiple IP sessions into a single AAL2 CID. This will be of advantage when used with the next generation of mobile communicators which will have the ability to send and receive electronic mail and to perform Internet browsing in addition to the standard function of making calls. Using the techniques described herein it is possible to encapsulate multiple PPP sessions from several terminals into a single CID between a base station and a mobile switching centre thus freeing a significant number of CIDs for the encapsulation of low delay voice calls.

The MID can be configured to the payload alone allowing full point code usage of the UUI field in the AAL2 CPS header. If required, error correction may be provided via a suitable parity or coding scheme.

The use of AAL2 together with a suitable SAR SSCS (Service Specific Convergence Sublayer) function provides the ability to transport PPP sessions in a very flexible manner, and the PPP sessions can be encapsulated in a number of ways which will be discussed below.

Figure 8:
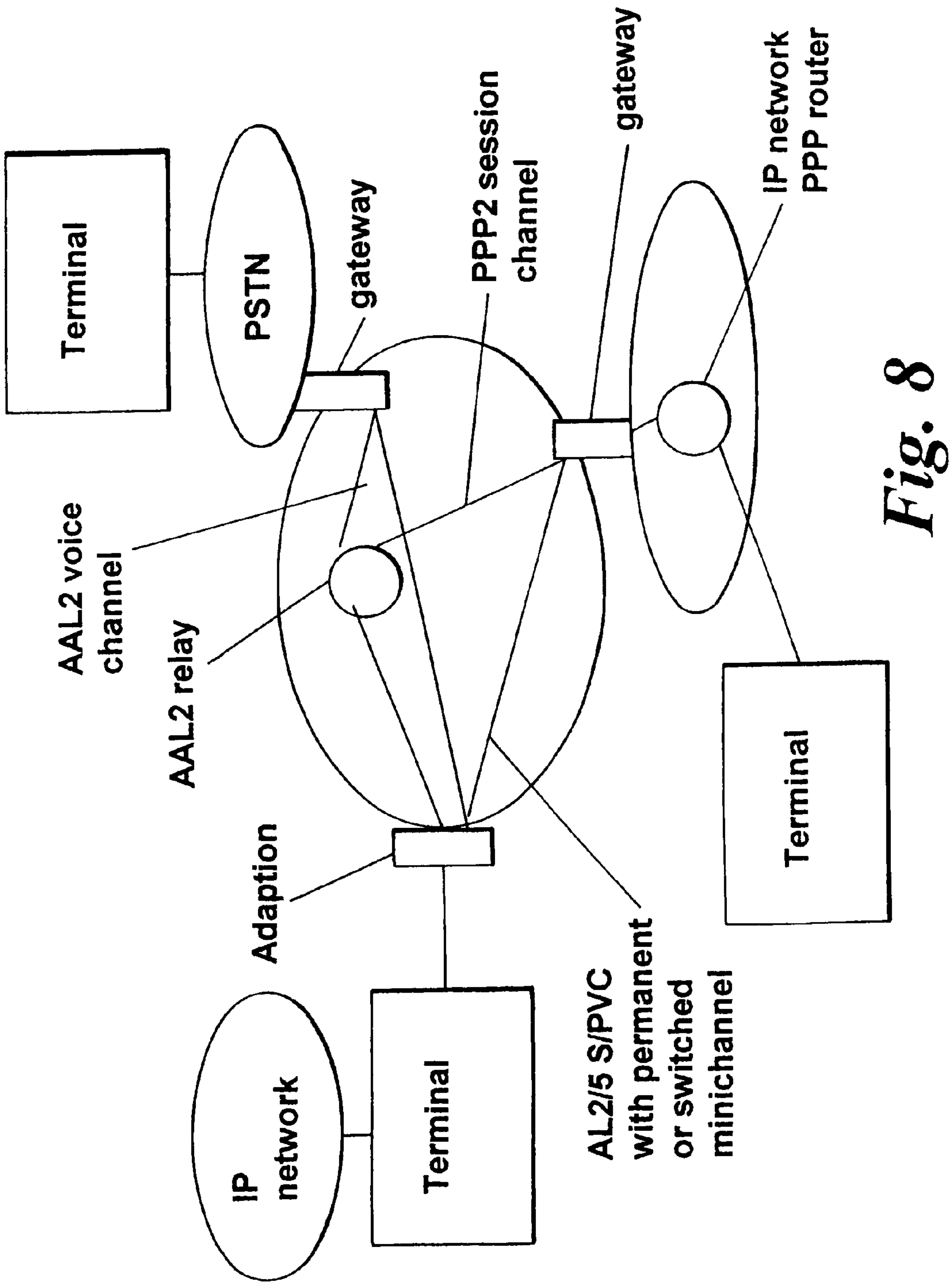
FIGS. 8 to 14 illustrate further embodiments of the invention.

FIG. 8 together with its associated logic diagram (FIG. 8*a*) illustrates in schematic form a single PPP session directly encapsulated into an AAL2 VCC (virtual channel connection). In the simplest case, the whole of the AAL2 is dedicated to transporting the PPP session in one CID only. In this arrangement, one CID per PPP session is established by the AAL2 negotiating procedure (ANP) at call set up. A protocol identifier (PID) may be provided in every payload to differentiate between protocols, but this of course does not extend to the support of multiple IP sessions per PPP session unless sequenced by higher layers. Alternatively, the PID can be provided in the first segment whereby the AAL2 SSCS SAR ensures sequencing, i.e. a non-parallel implementation.

The arrangement of FIG. 8 reduces the number of ATM voice VCs required, especially when combined with AAL2 access carrying other real time media over AAL5. It further allows common routing of media and can still provide different QoS over AAL5, as voice traffic can take priority over PPP. Multiple PPP sessions are possible in the same VC. Thus, a single PC or user terminal can function as a router for a source IP network, or an application such as H.323 can have media going to different end points.

Figures 8A, 8B:
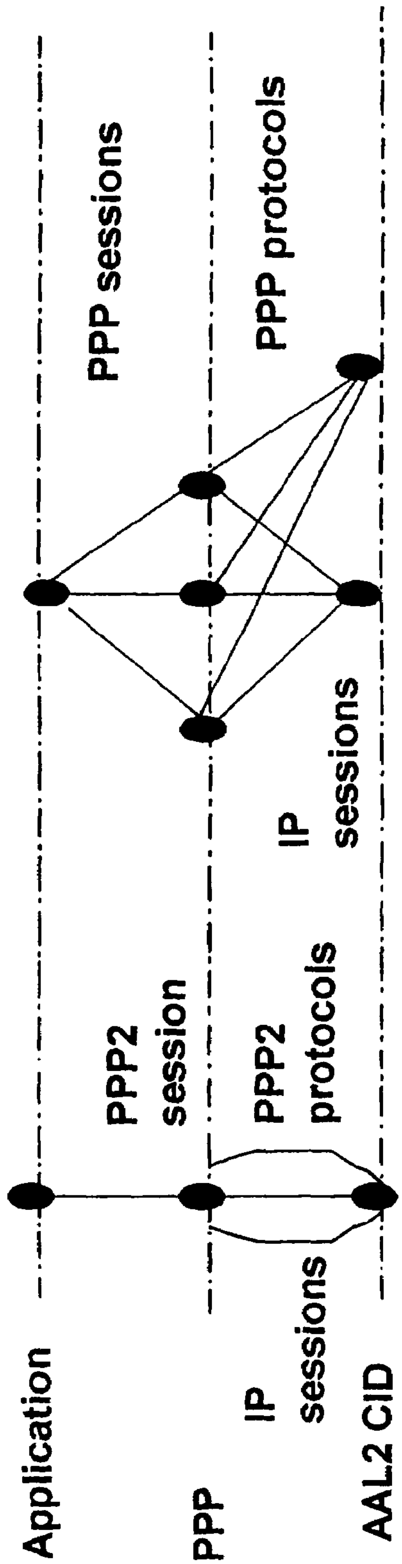

In a modification of this arrangement illustrated schematically in the logic diagram of FIG. 8*b*, a CID is provided for each PPP protocol from multiple PPP sessions and a MID is employed to determine the session per protocol due to the AAL2 segmentation. This provides access concentration of protocols, e.g. in mobile applications where traffic can be routed to IP and to non-IP data networks.

Figure 9:
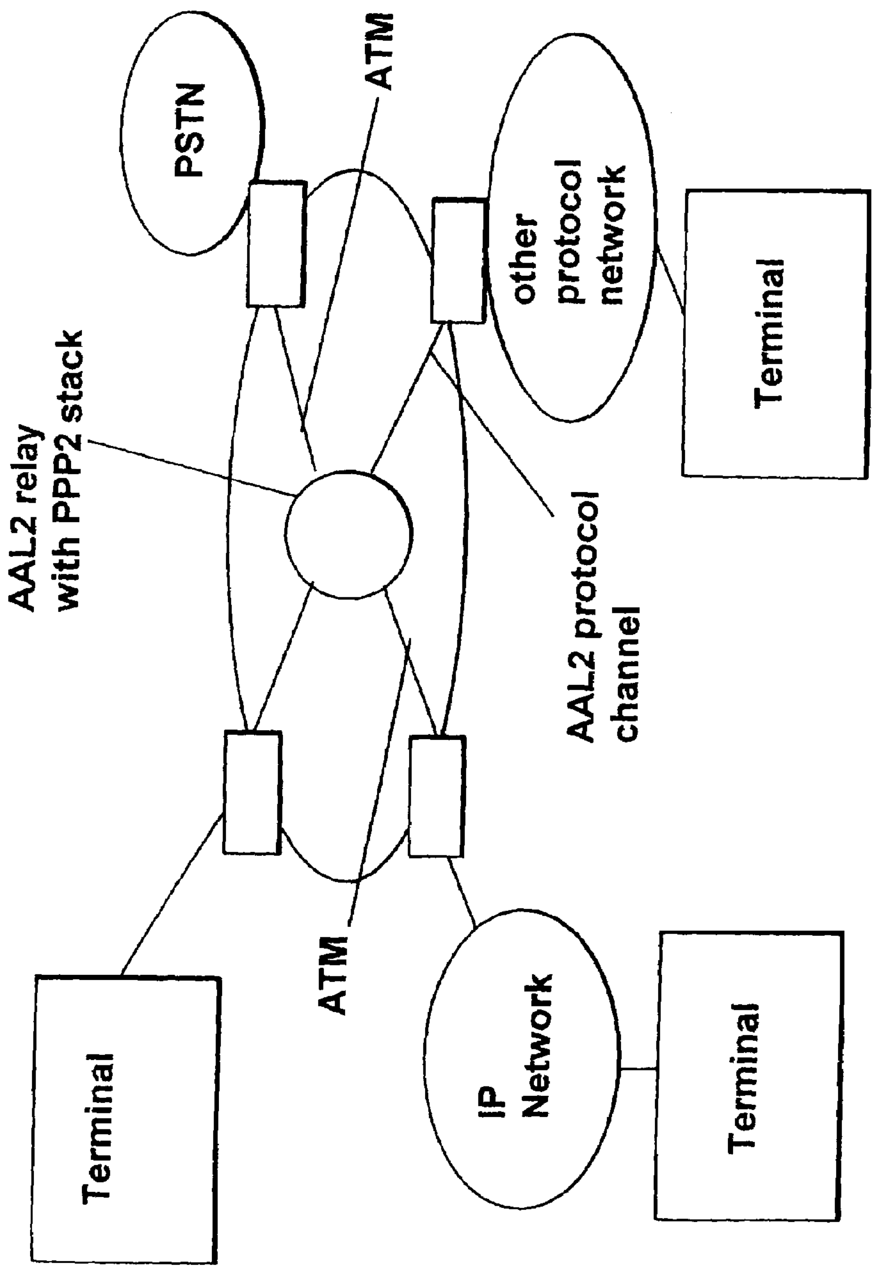
Figures 9A, 10A:
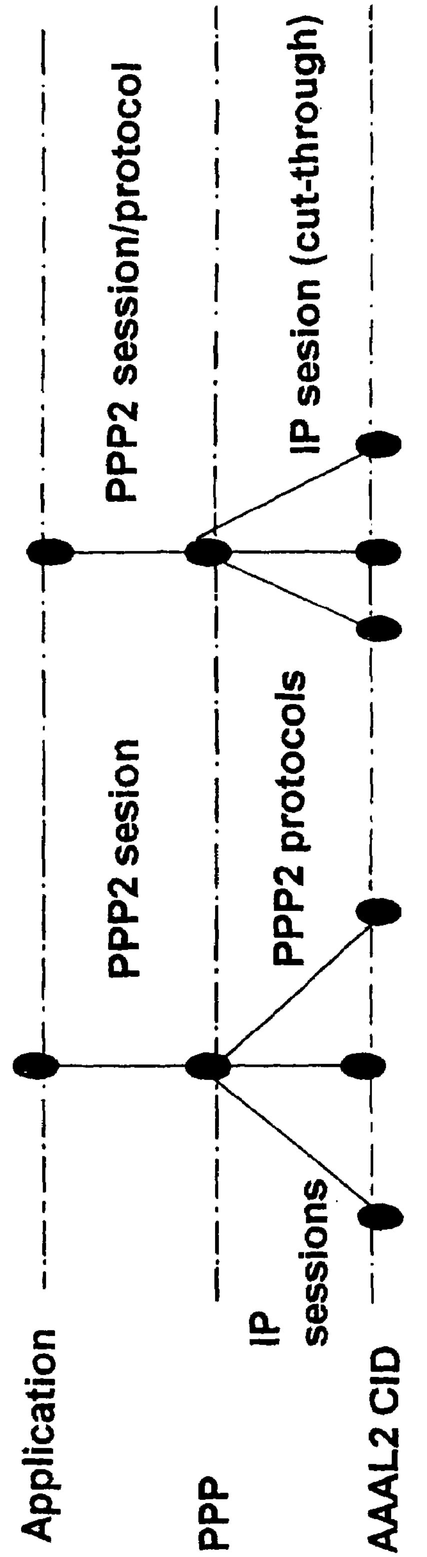

In another embodiment illustrated schematically in FIG. 9 together with the associated logic diagram of FIG. 9*a*, an entire VCC can be allocated to the transport of a PPP session in which each protocol can be treated in a different manner, e.g. offering a higher QoS (quality of service) for delay sensitive services, the use of CRCs (cyclic redundancy codes) for data traffic, and SNs for voice traffic. Additionally, the ANP can be used to establish minicells for the PPP protocols or sessions on demand. Thus, it is possible to support both the PPP session containing multiple PIDs and additional traffic within the same VCC. Multiple PPP sessions can be supported in a single AAL2 VCC where multiple CIDs are allocated to each session. Similarly, the VC can also support non-PPP traffic.

In the embodiment of FIG. 9, one CID per protocol can be established, in the dynamic case, under direction from the ANP, or, in the static case, without the ANP and by mapping the PID to the CID. The dynamic case can extend to IP sessions within a given PPP session and protocol by using NCP (network control program) to control the ANP and then providing a cut-through similar to multi-protocol over ATM (MPOA). If there are multiple IP sessions in the protocol, an MID (multiplexing identifier) is required where there is no cut-through and can be used to suppress the header. The arrangement allows different QoS control of different protocols, or different IP sessions in cut-through applications. All protocols can terminate at the same ATM end points, or an AAL2 relay with a PPP stack can be deployed to extend to virtual end points.

Figure 10:
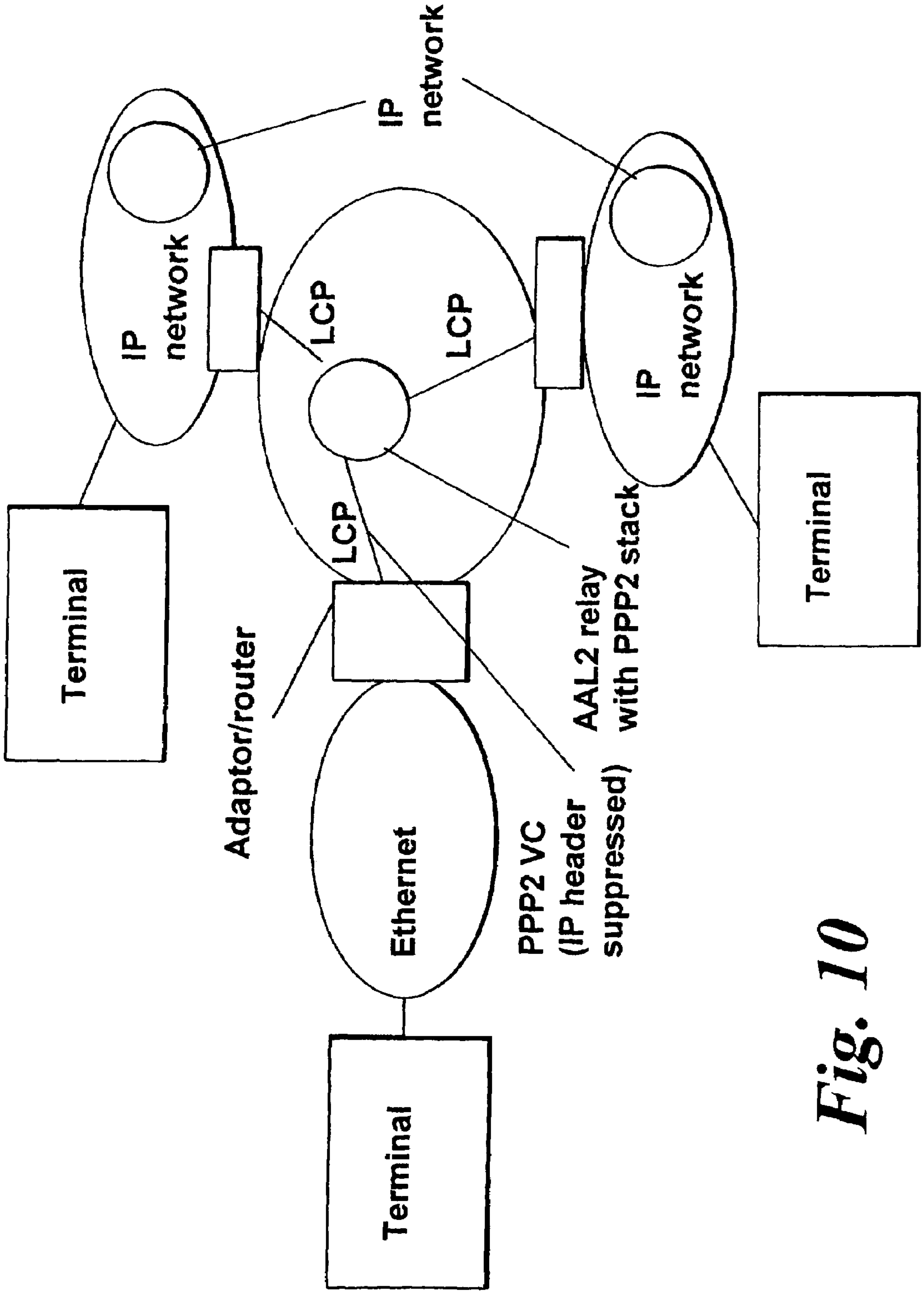

In the embodiment shown in FIG. 10 and its associated logic diagram FIG. 10*a*, there is one CID per PPP protocol session, e.g. as described above with reference to FIG. 8, but applied to the IP connections for the purpose of cut-through. The NCP uses the ANP to establish the cut-through route. The MID is not required. As shown in FIG. 10, the AAL2 relay uses LCP (Link Control Protocol) to perform authentication for each possible end point. The adapter/router performs cut-through and suppresses the IP header on connection oriented sessions.

Different QoS criteria can be applied to different IP sessions which could, for example, be different media components of an H.323 session. Different treatments for media or for protocols can be applied simultaneously. The use of TCP/IP header suppression significantly improves the efficient use of bandwidth. Further, the adapter/router can map alternately several PP (point to point) sessions. Advantageously, the same CID is used so that the AAL2 relay functions as a virtual router.

Figure 11:
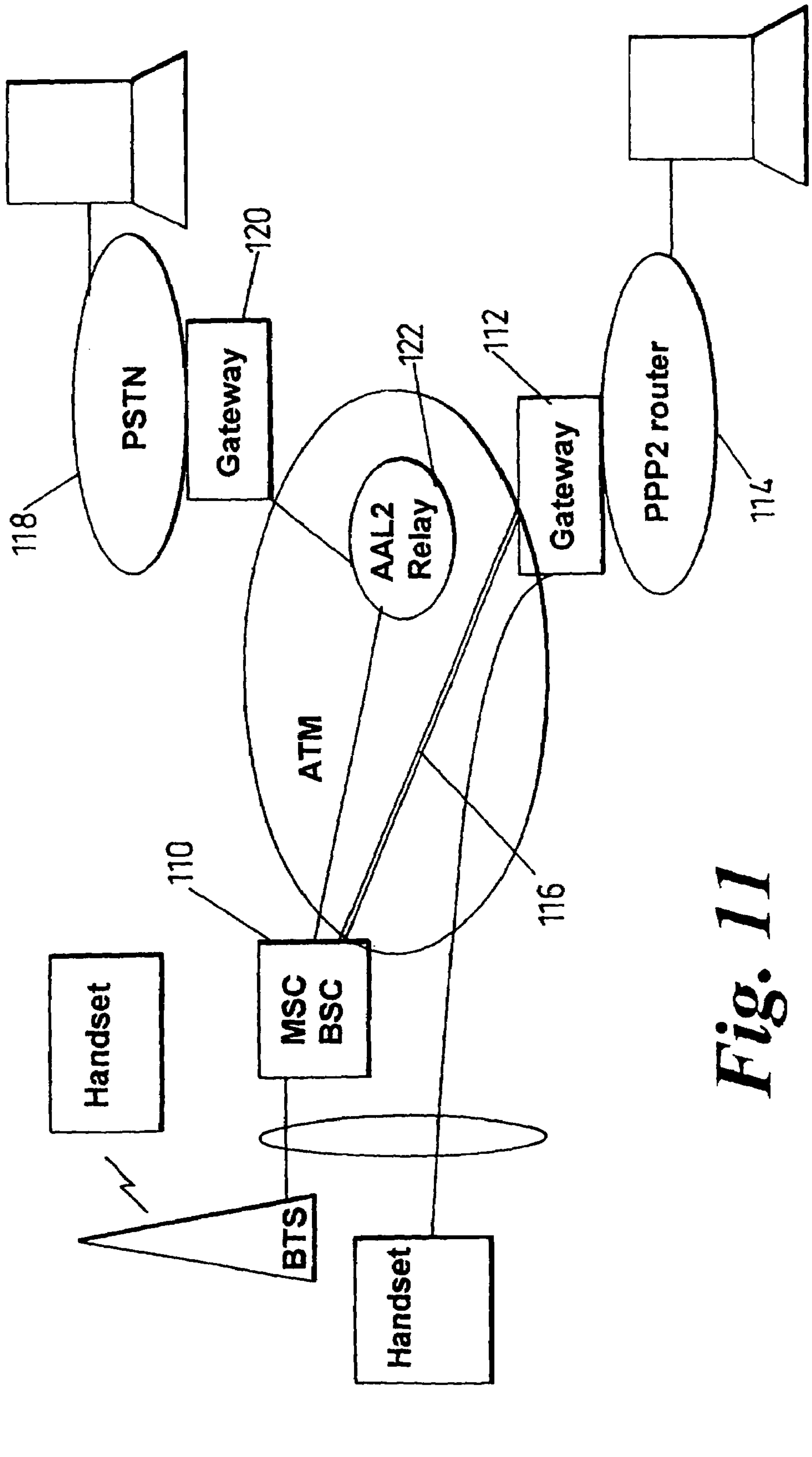
Figures 11A, 12A:
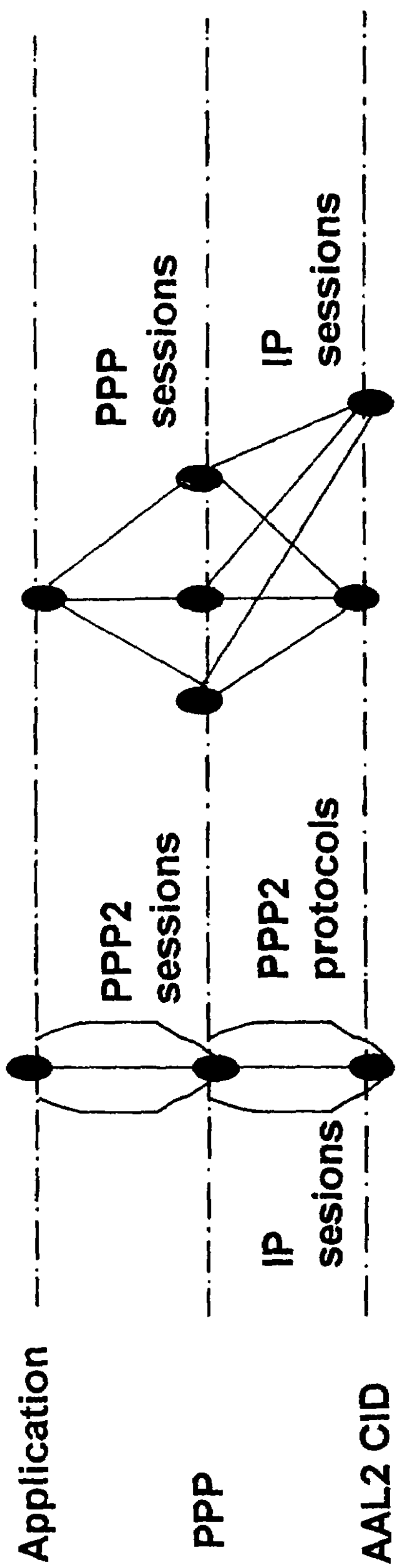

In the embodiment shown in FIG. 11 and the associated logic diagram 11*a*, multiple PPP sessions are transported in a single VCC, and all of the sessions are captured in a single CID. This arrangement can be used where it is desirable too aggregate many PPP sessions, for example between routers, whilst minimising the number of minichannels used. This has particular advantage in mobile applications.

In FIG. 11, the CID is established by the ANP for single or multiple LCP with a multiplex indicator to identify the session and to perform authentication and control. This is also of advantage in mobile applications where a base station may need to isolate data from several mobiles to ensure that voice is given a higher QoS than the collective data. The MID can be used to distinguish the PPP session ID, the PID and IP session as a multiplex of datagrams.

Figure 12:
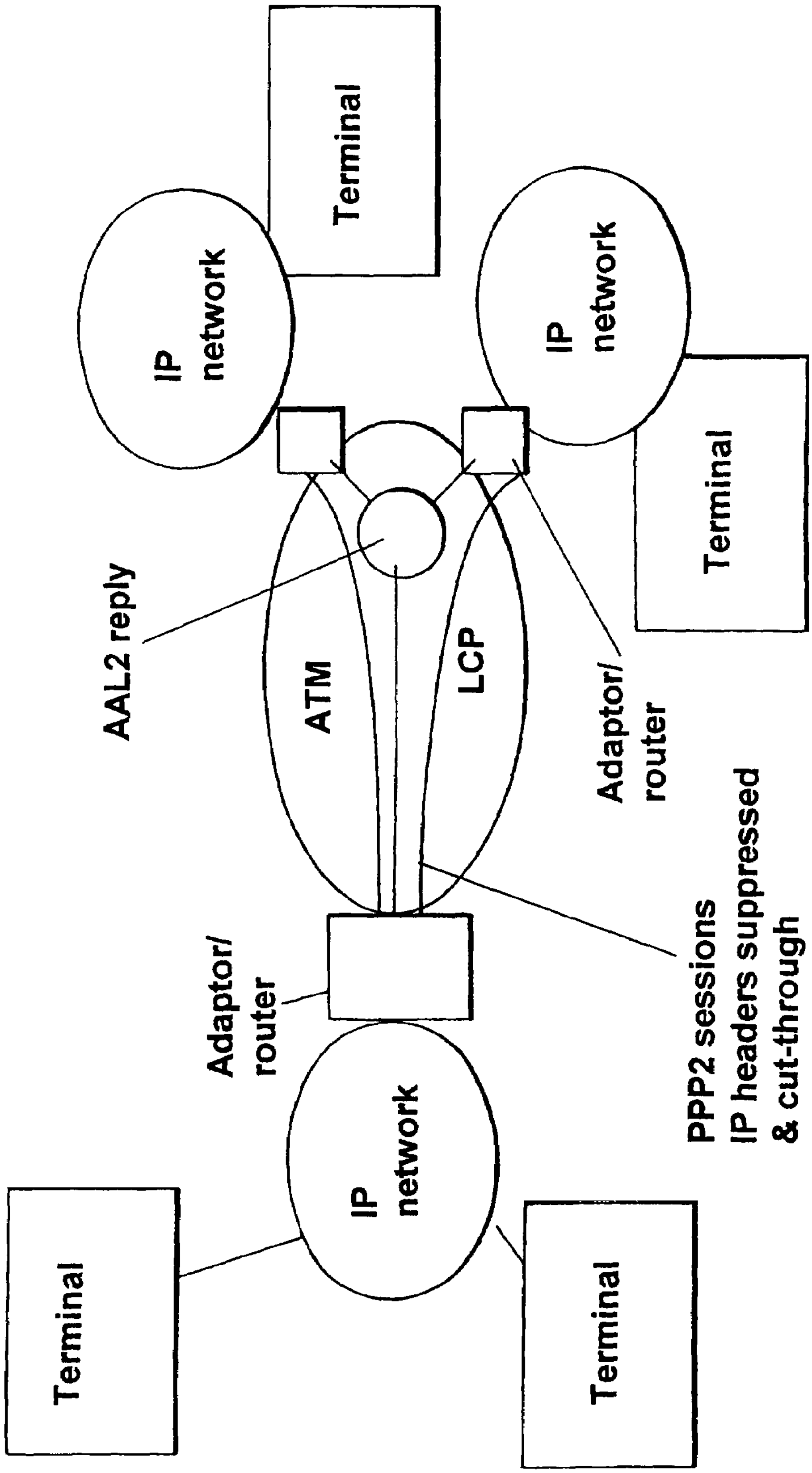

In the modification indicated in FIG. 12 and in the associated logic diagram of FIG. 11*b*, a CID is provided per set of IP sessions from multiple PPP sessions. This permits a cut-through route to be established for similarly routed IP sessions. The MID is required to distinguish the sessions and this allows suppression of the IP header. The AAL2 network then becomes a virtual routing network. Multiple H.323 sessions are possible and efficient routes can be created to ISP networks.

Figure 13:
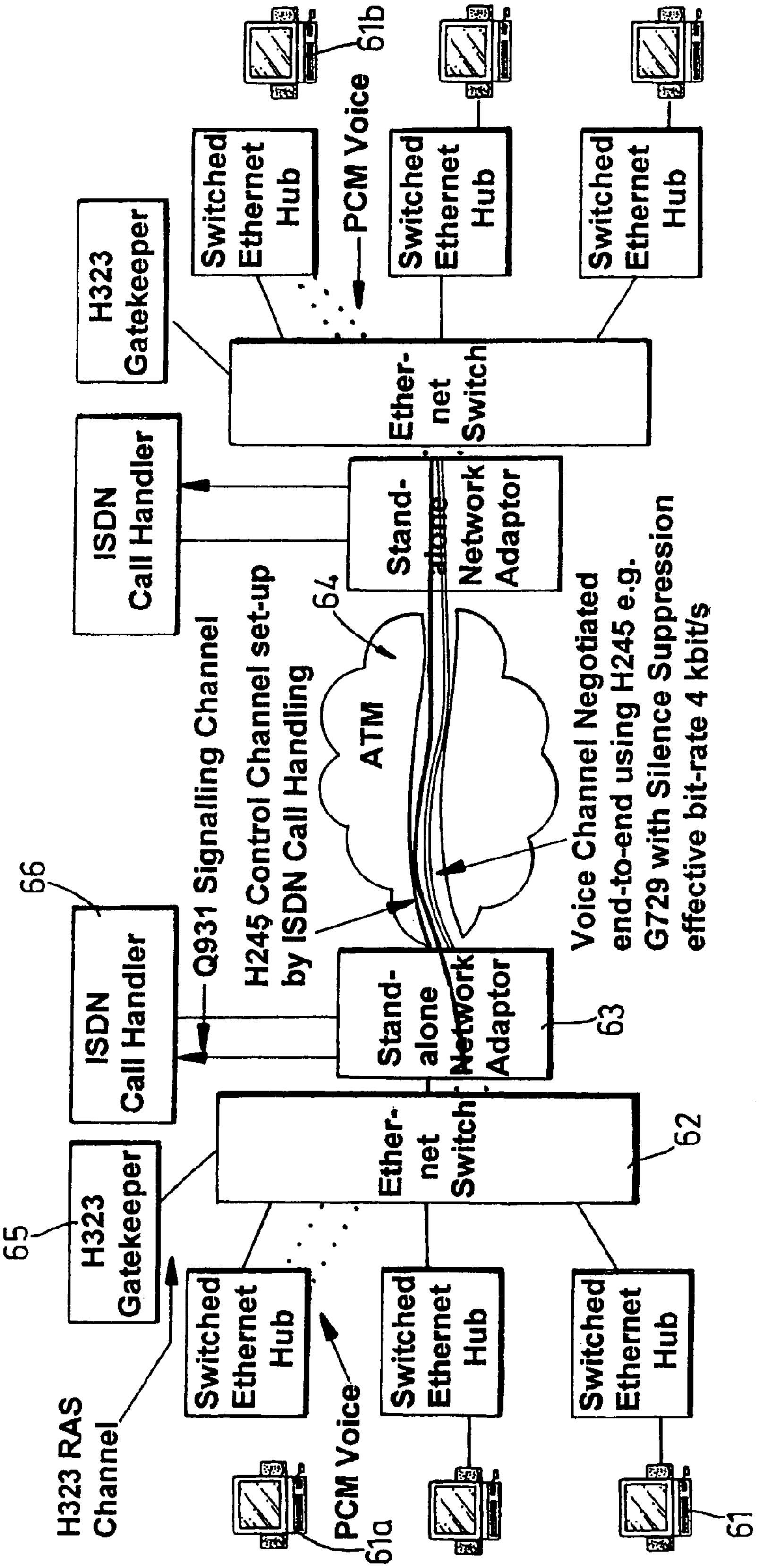

Referring now to FIG. 13, this shows an arrangement for transporting encapsulated PPP traffic over an asynchronous link and for trunking voice calls such that the multiple voice channels form a trunk group carried over a single point to point protocol (PPP) ATM trunk. In this arrangement, PPP sessions can be set up between work stations 61 via Ethernet switches 62, network adapters 63 and an ATM transport network 64. H323 gatekeepers 65 are coupled one to each Ethernet switch 62, and each network adapter is coupled to an ISDN call handler 66. The figure illustrates the establishment of a PPP session between two work stations 61*a* and 61*b*. In this arrangement, PPP is the IETF (Internet Engineering Task Force) protocol that is adapted to utilise an AAL2 VC. PPP eliminates IP headers and compresses the RTP/UDP (real time protocol/user data protocol) typically to three bytes.

The H323 standard provides three types of signalling channel, these being indicated on FIG. 12. An RAS channel enables registration, authentication and status to establish that the user is authorised for the H323 service. A Q931 ISDN signalling channel is set up to the ISDN call handler to effect calls. When the user makes a call, the third signalling channel is established end to end between the participating work stations or terminals and is used to negotiate the connectivity of the two terminals, to establish the particular coding to be employed and to support the voice channel end to end. The H245 control channel is intercepted to negotiate PCM voice and to apply compression and silence suppression. The voice channel provides a trunk link between the network adapters. Over this trunk link, multiplexing is used to fill the AAL2 cell and thus maximise capacity.

Figure 14:
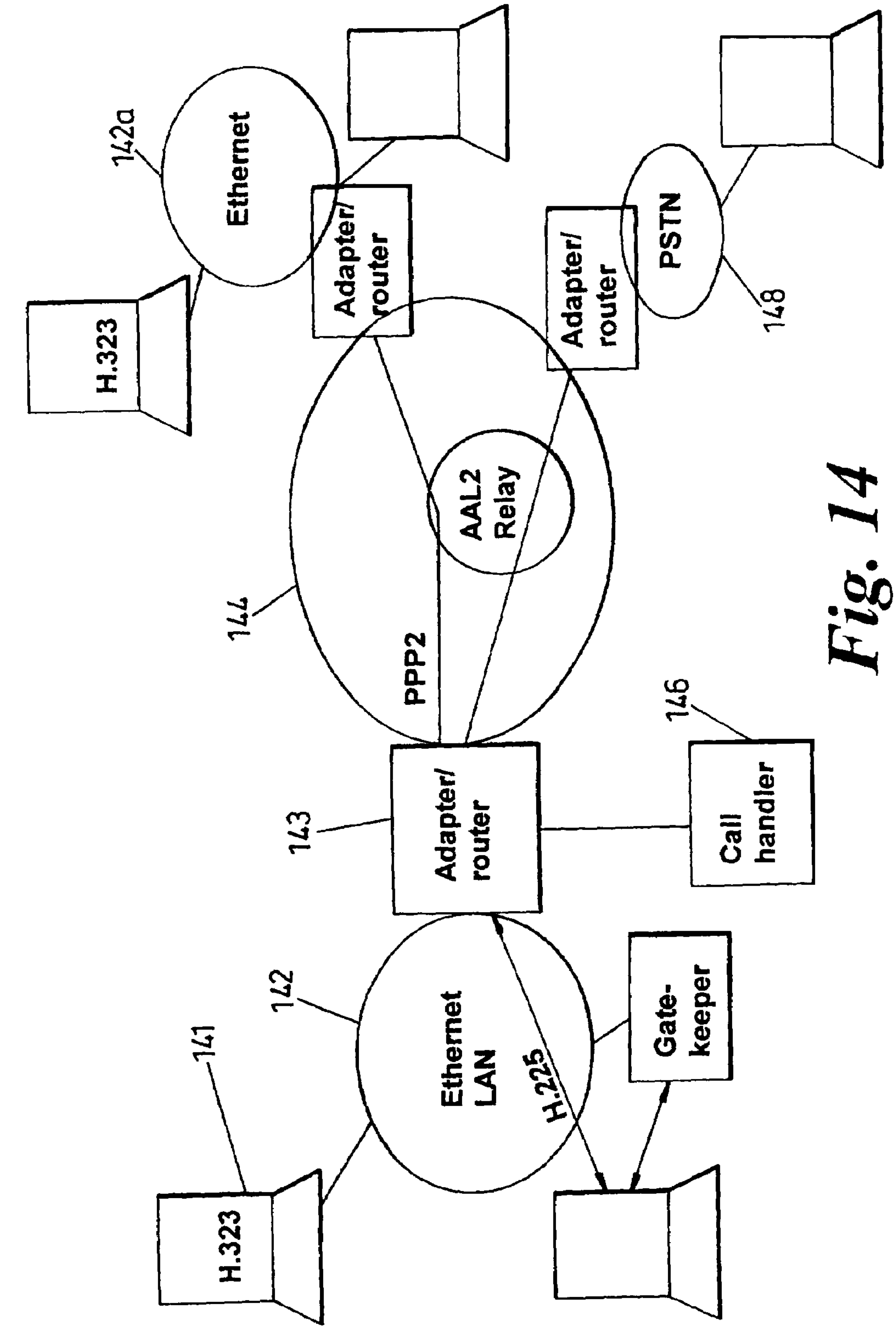

FIG. 14 illustrates a full H.323 application with multiple media. H.323 terminals 141 using H.225 call signalling may be coupled via an Ethernet 142 and an adapter/router 143 to an ATM network 144 performing an AAL2 relay function to carry a PPP session to a further Ethernet 142*a* or to a PSTN 148. A gatekeeper 145 retains a dialling plan and address resolution. A call handler 146 associated with the adapter/router 143 is arranged to set up a VC, e.g. via the Q2931 protocol. Alternatively the call handler can use the ANP to set up a PPP session to each end point from an address provided by the gatekeeper. The LCP and IP NCP establish IP networking. The call handler can also function as an H.245 signal router to negotiate IP media sessions and router ascribed PPP sessions to the correct end point based on the IP address.

The arrangements and method described above provide for flexibility in multiplexing. In particular, multiple PPP sessions can be multiplexed on the same VC, or PPP sessions can be multiplexed with other services on the same VC. There can be on PPP session per CID, or multiple PPP sessions per CID, or multiple CIDs per PPP session. Other combinations or variants will be apparent to the skilled worker.

It will be understood that the above description of a preferred embodiment is given by way of example only and that various modifications may be made by those skilled in the art without departing from the spirit and scope of the invention.

What is claimed is:

1. A method of transporting multi-protocol datagrams over a point to point protocol (PPP) link through an asynchronous transport network, comprising the steps of:

encapsulating multi-protocol datagrams into payloads of asynchronous transport network mini-cells, each mini-cell having a header in addition to a payload, the header including a channel identifier (CID) field;

for each mini-cell, associating a PPP identifier of the datagram being encapsulated therein with the CID field of the mini-cell by inserting a PPP identifier into the CID field of the mini-cell;

assembling said mini-cells into transport packets; and transporting said packets over said point to point link through the asynchronous transport network.

2. A method as claimed in claim 1, wherein said PPP identifier identifies a PPP session.

3. A method as claimed in claim 1, wherein said PPP identifier identifies at least one PPP protocol within a PPP session.

4. A method as claimed in claim 1, wherein the PPP identifier identifies at least one session within a protocol of a PPP session.

5. A method as claimed in claim 1, wherein the PPP identifier of a multi-protocol datagram comprises two octets, a most significant octet and a least significant octet, and the method includes the step of inserting only the least significant octet of the PPP identifier into the CID field of a mini-cell.

6. A method as claimed in claim 5, wherein it includes the step of inserting the most significant octet of the PPP identifier in a first byte of the mini-cell payload adjacent the header and to indicating the presence of said most significant octet in said first byte of the mini-cell payload by making a value of a least significant bit (LSB) of the least significant octet to be "1".

7. A method as claimed in claim 6, wherein a LSB of the most significant octet of the PPP identifier is utilised as a bit parity check for error detection.

8. A method as claimed in claim 1, wherein the step of associating a PPP identifier with the CID field of a mini-cell comprises assigning a pre-allocated PPP identifier number to a respective mini-cell CID value and inserting the CID value into the CID field of the mini-cell.

9. A method as claimed in claim 8, wherein the step of assigning a pre-allocated PPP identifier number to a CID value and inserting said CID value into the CID field of a mini-cell includes obtaining the CID value corresponding to a pre-allocated PPP identifier number from a preconfigured table containing a list of pre-allocated PPP identifiers numbers and corresponding CID values.

10. A method as claimed in claim 8, wherein the step of assigning a pre-allocated PPP identifier number to a CID value and inserting said CID value in the CID field of a mini-cell comprises assigning said pre-allocated PPP identifier number to said CID value on set-up of a PPP link, said assignment being carried out by a management function.

11. A method as claimed in claim 1, wherein the asynchronous transport network is an asynchronous transport mode (ATM) network and the mini-cells are ATM adaptation layer 2 (AAL2) mini-cells.

12. A method as claimed in claim 11, wherein it includes the step of mapping a PPP session to a single AAL2 channel.

13. A method as claimed in claim 11, wherein it includes the step of mapping at least one protocol of a PPP session to an AAL2 channel.

14. A method as claimed in claim 11, wherein it includes the step of mapping at least one session of a specified PPP protocol to an AAL2 channel.

15. A method as claimed in claim 11, wherein it includes the step of mapping several PPP sessions to a same AAL2 channel.

16. A method as claimed in claim 11, wherein it includes the step of mapping several protocols from different PPP sessions to a same AAL2 channel.

17. A method as claimed in claim 16, wherein the several protocols from different PPP sessions comprise the same protocol from each of the different PPP sessions.

18. A method as claimed in claim 11, wherein it includes the step of mapping at least one session of a specified PPP protocol of several PPP sessions to a same AAL2 channel.

19. A method as claimed in claim 11 wherein it includes a mapping step, said mapping step comprising a combination of any of:

mapping a PPP session to a single AAL2 channel;

mapping at least one protocol of a PPP session to an AAL2 channel;

mapping at least one session of a specified PPP protocol to an AAL2 channel;

mapping several PPP sessions to a same AAL2 channel;

mapping several protocols from different PPP sessions to a same AAL2 channel; and mapping at least one session of a specified PPP protocol of several PPP sessions to a same AAL2 channel;

wherein said AAL2 channels comprise an ATM virtual circuit connection (VCC).

20. A method as claimed in any one of claims 11 to 19, wherein it includes the step of scheduling transport of ATM mini-cells of said AAL2 channels according to the type of PPP datagrams encapsulated in the mini-cells being transported in respective AAL2 channels.

21. A method as claimed in claim 11 wherein it includes a mapping step, said mapping step comprising one of:

mapping a PPP session to a single ATM virtual channel connection (VCC);

mapping at least one protocol of a PPP session to an ATM VCC;

mapping at least one session of a specified PPP protocol to an ATM VCC mapping several PPP sessions to a same ATM VCC;

mapping several protocols from different PPP sessions to a same ATM VCC; and mapping at least one session of a specified PPP protocol of several PPP sessions to a same ATM VCC.

22. A method as claimed 11, wherein it includes the step of multiplexing mini-cells into an ATM virtual channel connection (VCC).

23. A method as claimed in claim 22, wherein said step of multiplexing mini-cells into an ATM virtual channel connection (VCC) includes multiplexing mini-cells encapsulating PPP datagrams and mini-cells encapsulating non-PPP datagrams into the ATM VCC.

24. A method as claimed in claim 23, wherein said PPP traffic data comprises voice traffic data.

25. A method as claimed in claim 11, wherein the multiprotocol datagrams are encapsulated into mini-cells of variable lengths.

26. A method as claimed in claim 11, wherein multiprotocol datagrams comprising delay sensitive traffic are encapsulated into mini-cells comprising a first channel of an ATM virtual circuit (VC) and datagrams comprising delay insensitive traffic are encapsulated into mini-cells comprising a second channel of said ATM VC.

27. A method as claimed in claim 11, wherein said step of assembling mini-ells into transport packets comprises assembling mini-cells into ATM packets.

28. A method as claimed in claim 11, wherein said step of assembling mini-cells into transport packets comprises assembling mini-cells directly into MPEG-TS frames.

29. A method as claimed in claim 11, wherein said step of assembling mini-cells into transport packets comprises assembling mini-cells directly into TDMA time slots.

30. A method as claimed in claim 1, wherein it includes the step of encoding a flag in a user to user information (UUI) field of a mini-cell to indicate whether an encapsulated datagram extends into a payload of a next mini-cell.

31. A method as claimed in claim 1, wherein the step of encapsulating a datagram in a mini-cell includes inserting the PPP identifier, a payload of the datagram and an optional trailer into the payload of the mini-cell.

32. A method of encapsulating point to point protocol (PPP) datagrams into payloads of asynchronous transport network mini-cells, each mini-cell having a header in addition to a payload, the header including a channel identifier (CID) field, the method comprising the steps of:

encapsulating the PPP datagrams into the payloads of the asynchronous transport network mini-cells;

for each mini-cell, associating a PPP identifier of the datagram being encapsulated therein with the CID field of the mini-cell by inserting a PPP identifier into the CID field of the mini-cell; and assembling said mini-cells into transport packets.

33. A method as claimed in claim 32, wherein said PPP identifier identifies a PPP session.

34. A method as claimed in claim 32, wherein said PPP identifier identifies at least one PPP protocol within a PPP session.

35. A method as claimed in claim 32, wherein the PPP identifier identifies at least one session within a protocol of a PPP session.

36. A method as claimed in claim 32, wherein the PPP identifier of a multi-protocol datagram comprises two octets, a most significant octet and a least significant octet, and the method includes the step of inserting only the least significant octet of the PPP identifier into the CID field of a mini-cell.

37. A method as claimed in claim 36, wherein it includes the step of inserting the most significant octet of the PPP identifier in a first byte of the mini-ell payload adjacent the header and to indicating the presence of said most significant octet in said first byte of the mini-cell payload by making a value of a least significant bit (LSB) of the least significant octet to be "1".

38. A method as claimed in claim 37, wherein a LSB of the most significant octet of the PPP identifier is utilised as a bit parity check for error detection.

39. A method as claimed in claim 32, wherein the step of associating a PPP identifier with the CID field of a mini-cell comprises assigning a pre-allocated PPP identifier number to a respective mini-cell CID value and inserting the CID value into the CID field of the mini-cell.

40. A method as claimed in claim 39, wherein the step of assigning a pre-allocated PPP identifier number to a CID value and inserting said CID value into the CID field of a mini-cell includes obtaining the CID value corresponding to a pre-allocated PPP identifier number from a pre-configured table containing a list of pre-allocated PPP identifiers numbers and corresponding CID values.

41. A method as claimed in claim 39, wherein the step of assigning a pre-allocated PPP identifier number to a CID value and inserting said CID value in the CID field of a mini-cell comprises assigning said pre-allocated PPP identifier number to said CID value on set-up of a PPP link, said assignment being carried out by a management function.

42. A method as claimed in claim 32, wherein the asynchronous transport network is an asynchronous transport mode (ATM) network and the mini-cells are ATM adaptation layer 2 (AAL2) mini-cells.

43. A method as claimed in claim 42, wherein it includes the step of mapping a PPP session to a single AAL2 channel.

44. A method as claimed in claim 42, wherein It Includes the step of mapping at least one protocol of a PPP session to an AAL2 channel.

45. A method as claimed in claim 42, wherein it includes the step of mapping at least one session of a specified PPP protocol to an AAL2 channel.

46. A method as claimed in claim 42, wherein it includes the step of mapping several PPP sessions to a same AAL2 channel.

47. A method as claimed in claim 42, wherein it includes the step of mapping several protocols from different PPP sessions to a same AAL2 channel.

48. A method as claimed in claim 47, wherein the several protocols from different PPP sessions comprise the same protocol from each of the different PPP sessions.

49. A method as claimed in claim 42, wherein It Includes the step of mapping at least one session of a specified PPP protocol of several PPP sessions to a same AAL2 channel.

50. A method as claimed in claim 42 wherein It includes a mapping step, said mapping step comprising a combination of any of:

mapping a PPP session to a single AAL2 channel;

mapping at least one protocol of a PPP session to an AAL2 channel;

mapping at least one session of a specified PPP protocol to an AAL2 channel;

mapping several PPP sessions to a same AAL2 channel;

mapping several protocols from different PPP sessions to a same AAL2 channel; and mapping at least one session of a specified PPP protocol of several PPP sessions to a same AAL2 channel;

wherein said AAL2 channels comprise an ATM virtual circuit connection (VCC).

51. A method as claimed in any one of claims 42 to 50, wherein it includes the step of scheduling transport of ATM mini-cells of said AAL2 channels according to the type of PPP datagrams encapsulated in the mini-cells being transported in respective AAL2 channels.

52. A method as claimed in claim 42 wherein it includes a mapping step, said mapping step comprising one of:

mapping a PPP session to a single ATM virtual channel connection (VCC);

mapping at least one protocol of a PPP session to an ATM VCC;

mapping at least one session of a specified PPP protocol to an ATM VCC mapping several PPP sessions to a same ATM VCC;

mapping several protocols from different PPP sessions to a same ATM VCC; and mapping at least one session of a specified PPP protocol of several PPP sessions to a same ATM VCC.

53. A method as claimed 42, wherein it includes the step of multiplexing mini-cells into an ATM virtual channel connection (VCC).

54. A method as claimed in claim 53, wherein said step of multiplexing mini-cells into an ATM virtual channel connection (VCC) includes multiplexing mini-ells encapsulating PPP datagrams and mini-cells encapsulating non-PPP datagrams into the ATM VCC.

55. A method as claimed in claim 54, wherein said PPP traffic data comprises voice traffic data.

56. A method as claimed in claim 42, wherein the multiprotocol datagrams are encapsulated into mini-cells of variable lengths.

57. A method as claimed in claim 42, wherein multiprotocol datagrams comprising delay sensitive traffic are encapsulated into mini-cells comprising a first channel of an ATM virtual circuit (VC) and datagrams comprising delay insensitive traffic are encapsulated into mini-cells comprising a second channel of said ATM VC.

58. A method as claimed in claim 42, wherein said step of assembling mini-cells into transport packets comprises assembling mini-cells into ATM packets.

59. A method as claimed in claim 32, wherein It Includes the step of encoding a flag in a user to user information (UUI) field of a mini-cell to indicate whether an encapsulated datagram extends into a payload of a next mini-cell.

60. A method as claimed in claim 32, wherein the step of encapsulating a datagram in a mini cell includes inserting the PPP identifier, a payload of the datagram and an optional trailer into the payload of the mini-cell.

61. Apparatus for transporting multi-protocol datagrams over a point to point protocol (PPP) link through an asynchronous transport network, comprising:

encapsulating means arranged to encapsulate multi-protocol datagrams into payloads of asynchronous transport network mini-cells, each mini-cell having a header in addition to a payload, the header including a channel identifier (CID) field;

associating means arranged to associate a PPP identifier of a datagram being encapsulated into a mini-cell with the CID field of the mini-cell by inserting a PPP identifier into the CID field of the mini-cell;

assembling means arranged to assemble said mini-cells into transport packets; and transporting means arranged to transport said packets over said point to point link through the asynchronous transport network.

62. A transport apparatus as claimed in claim 61, wherein the associating means is arranged to insert only a least significant octet of a two octet PPP identifier into the CID field of a mini-cell.

63. A transport apparatus as claimed in claim 62, wherein the associating means is arranged to insert a most significant octet of the PPP identifier in a first byte of the mini-cell payload adjacent the header and to indicating the presence of said most significant octet in said first byte of the mini-cell payload by making a value of a least significant bit (LSB) of the least significant octet to be "1".

64. A transport apparatus as claimed in claim 61, wherein the associating mean is arranged to assign a pre-allocated PPP identifier number to a respective mini-cell CID value and to insert the CID value into the CID field of the mini-cell.

65. A transport apparatus as claimed in claim 61, wherein the asynchronous transport network is an asynchronous transport mode (ATM) network and the mini-cells are ATM adaptation layer 2 (AAL2) mini-ells.

66. A transport apparatus as claimed in claim 65, wherein it includes scheduling means arranged to schedule transport of ATM mini-cells of said AAL2 channels according to the type of PPP datagrams encapsulated in the mini-cells being transported in respective AAL2 channels.

67. A transport apparatus as claimed 65, wherein it includes multiplexing means arranged to multiplex a mini-cells into an ATM virtual channel connection (VCC).

68. A transport apparatus as claimed in claim 67, wherein said multiplexing means is arranged to multiplex mini-cells encapsulating PPP datagrams and mini-cells encapsulating non-PPP datagrams into the ATM VCC.

69. A transport apparatus as claimed in claim 65, wherein the encapsulating means is arranged to encapsulate datagrams comprising delay sensitive traffic into mini-cells comprising a first channel of an ATM virtual circuit (VC) and encapsulate datagrams comprising delay insensitive traffic into mini-cells comprising a second channel of said ATM VC.

70. A transport apparatus as claimed in claim 65, wherein said assembling means is arranged to assemble mini-cells into ATM packets.

71. A transport apparatus as claimed in claim 65, wherein said assembling means is arranged to assemble mini-cells directly into MPEG-TS frames.

72. A transport apparatus as claimed in claim 65, wherein said assembling means is arranged to assemble mini-cells directly into TDMA time slots.

73. Apparatus for encapsulating point to point protocol (PPP) datagrams into payloads of asynchronous transport network mini-cells, each mini-cell having a header in addition to a payload, the header including a channel identifier (CID) field, the apparatus comprising:

encapsulating means arranged to encapsulate the PPP datagrams into the payloads of the asynchronous transport network mini-cells;

associating means arranged to associate a PPP identifier of a datagram being encapsulated into a mini-cell with the CID field of the mini-cell by inserting a PPP identifier into the CID field of the mini-cell; and assembling means arranged to assemble said mini-cells into transport packets.

74. An apparatus as claimed in claim 73, wherein the associating means is arranged to insert only a least significant octet of a two octet PPP identifier into the CID field of a mini-cell.

75. An apparatus as claimed in claim 74, wherein the associating means is arranged to insert a most significant octet of the PPP identifier in a first byte of the mini-cell payload adjacent the header and to indicating the presence of said most significant octet in said first byte of the mini-cell payload by making a value of a least significant bit (LSB) of the least significant octet to be "1".

76. An apparatus as claimed in claim 73, wherein the associating means is arranged to assign a pre-allocated PPP identifier number to a respective mini-cell CID value and to insert the CID value into the CID field of the mini-cell.

77. An apparatus as claimed in claim 73, wherein the asynchronous transport network is an asynchronous transport mode (ATM) network and the mini-cells are ATM adaptation layer 2 (AAL2) mini-cells.

78. An apparatus as claimed in claim 77, wherein it includes scheduling means arranged to schedule transport of ATM mini-cells of said AAL2 channels according to the type of PPP datagrams encapsulated in the mini-cells being transported in respective AAL2 channels.

79. An apparatus as claimed 77, wherein it includes multiplexing means arranged to multiplex mini-cells into an ATM virtual channel connection (VCC).

80. An apparatus as claimed in claim 79, wherein said multiplexing means is arranged to multiplex mini-cells encapsulating PPP datagrams and mini-cells encapsulating non-PPP datagrams into the ATM VCC.

81. An apparatus as claimed in claim 77, wherein the encapsulating means is arranged to encapsulate datagrams comprising delay sensitive traffic into mini-cells comprising a first channel of an ATM virtual circuit (VC) and encapsulate datagrams comprising delay insensitive traffic into mini-cells comprising a second channel of said ATM VC.

82. An apparatus as claimed in claim 77, wherein said assembling means is arranged to assemble mini-cells into ATM packets.

83. An apparatus as claimed in claim 77, wherein said assembling means is arranged to assemble mini-cells directly into MPEG-TS frames.

84. An apparatus as claimed in claim 77, wherein said assembling means is arranged to assemble mini-cells directly into TDMA time slots.

* * * * *